United States Patent [19]

Yamaguchi et al.

[11] Patent Number: 4,771,353
[45] Date of Patent: Sep. 13, 1988

[54] MAGNETIC TAPE CASSETTE HAVING A TRANSLUCENT ROUGH SURFACE ON A REEL FLANGE

[75] Inventors: Koushi Yamaguchi; Minoru Yahagi, both of Miyagi, Japan

[73] Assignee: Sony Corporation, Tokyo, Japan

[21] Appl. No.: 909,901

[22] Filed: Sep. 22, 1986

[30] Foreign Application Priority Data

Oct. 4, 1985 [JP] Japan .................. 60-152724

[51] Int. Cl.$^4$ .................................... G11B 23/087
[52] U.S. Cl. .................................... 360/132
[58] Field of Search .................. 360/132; 242/198

[56] References Cited

U.S. PATENT DOCUMENTS 4,631,618 12/1986 Ozawa et al. .................. 360/132

Primary Examiner—Robert S. Tupper
Attorney, Agent, or Firm—Ronald P. Kananen

[57] ABSTRACT

A magnetic tape cassette includes means comprising a translucent, rough surface formed on the upper flange. The rough surface has a roughness on a scale of 5 to 20 $\mu$m, and preferably 5 to 10 $\mu$m.

22 Claims, 1 Drawing Sheet

MAGNETIC TAPE CASSETTE HAVING A TRANSLUCENT ROUGH SURFACE ON A REEL FLANGE

BACKGROUND OF THE INVENTION

The present invention relates in general to a new magnetic tape cassette and more particularly to a magnetic tape cassette which houses tape reels in the cassette casing, the tape reel including a upper flange, and which is provided with a window on its upper surface in order to observe an inside magnetic tape.

As is well known, magnetic tape cassettes comprise a supply reel and a take-up reel onto which a magnetic tape is wound, a cassette casing which houses the reels and a tape cover member preventing the magnetic tape at the front of the cassette casing from dust and damage, the tape cover member being rotatably mounted at both ends of the front edge of the cassette casing by means of two pins.

The cassette casing comprises rectangular lower and upper shells and is formed by joining the upper and lower shells by means of screws or the like. The upper shell constituting the upper surface of the cassette casing is provided with a window. The window is provided with a transparent plate integral with the upper shell, so that the inside tape reels can be observed from the window through the transparent plate.

The tape reel comprises an axle and upper and lower flanges. The lower flange (reel hub) is made of a transparent resin, the peripheral surface of which has teeth.

The upper flange is made of a transparent material, so that the amount of the magnetic tape remaining on the tape reel can be seen from above. The reel is provided with an opening allowing a clamp piece, which clamps one end of the magnetic tape, ingress and egress.

Since the upper flange of the tape reel of the prior art magnetic tape cassette is made of a transparent resin so that the amount of magnetic tape remaining can be seen, the following problems have arisen.

First, since the upper flange is transparent, dust and/or marks on the surface of the flange are very conspicuous, whereupon the exterior appearance is unattractive. The flange can be designed so as to suppress dust and/or damage, but it is impossible to fully eliminate dust and/or marks. Because fine dust is often deposited on the inside surfaces of the metallic mold in which the flange is fabricated of resin by way of injection molding, the surface of finished flanges is often dusty. Furthermore, marks often appear on the inside surfaces of metallic molds. The inside surfaces of a metallic mold are corroded by gasses produced by the resin, which damage the inside surfaces generating scars. Furthermore, scars are often produced when the finished flanges are removed. The upper flanges can also be damaged due to collision with one another while in storage. The surface of flange may also be damaged while in a reel-conveying tray after the tape reel is assembled but before the magnetic tape is wound thereon.

Furthermore, the surface of the upper flange may be damaged by a contact needle used to measure whether the flange wobbles as the tape reel rotates. Concretely, this kind of measurement can be performed optically or by contact. In the optical-type measurement, the target to be measured is illuminated and the reflected light is monitored in order to determine whether or not the flange oscillates. Therefore, a transparent upper flange requires contact-type measurement. Since the contact-type measurement is carried out by bringing a contact needle into contact with the surface of the measured object, the upper flange may be damaged by the contact needle.

SUMMARY OF THE INVENTION

Therefore, it is an object of the present invention to provide a magnetic tape cassette of which the exterior appearance is attractive.

In order to accomplish the above-mentioned and other objects, a magnetic tape cassette, according to the present invention, comprises:

a tape reel onto which a magnetic tape is wound, and which has an upper flange;

a cassette casing which houses said tape reel;

a window provided in the upper surface of the cassette casing in order to observe the inside magnetic tape; and means by which dust and/or damage scars on the surface of the upper flange are made to be inconspicuous.

In accordance with one aspect of the present invention, a magnetic tape cassette comprises:

a tape reel onto which a magnetic tape is wound, and which has an upper flange;

a cassette casing which houses said tape reel;

a window provided in the upper surface of the cassette casing in order to observe the inside magnetic tape; and means comprising a translucent, rough surface formed on the upper flange.

BRIEF DESCRIPTION OF THE DRAWINGS

The present invention will be understood more fully from the detailed description given hereinafter and from the accompanying drawings of the preferred embodiment of the present invention, which however should not be taken as limitative to the invention but are for explanation only.

In the drawings.

DESCRIPTION OF THE PREFERRED EMBODIMENT

A magnetic tape cassette of the present invention is described in detail below in accordance with the preferred embodiment in accompanying drawings.

Figure 1:
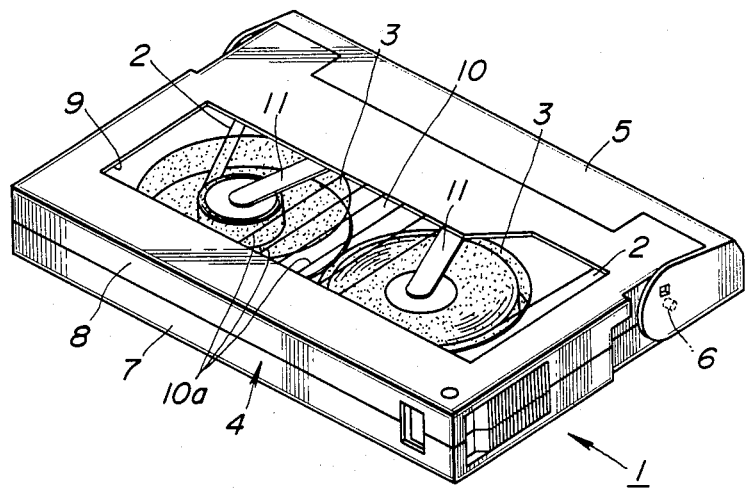
FIG. 1 is a perspective view of a magnetic tape cassette according to the invention.
Figure 2:
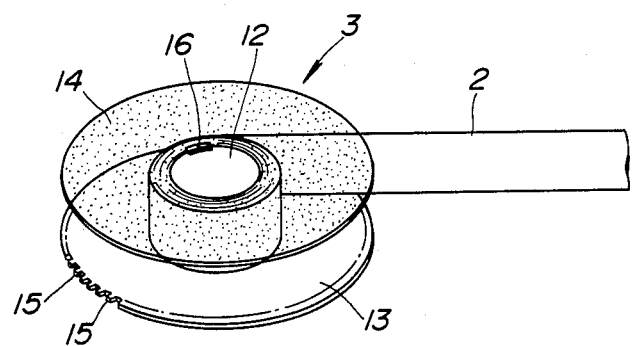
FIG. 2 is a perspective view of a tape reel thereof.

FIGS. 1 and 2 are perspective views of a magnetic tape cassette and of a tape reel according to the present invention, respectively.

A magnetic tape cassette 1 according to the invention comprises a cassette casing 4 housing two tape reels onto which a magnetic tape 2 is wound, and a tape cover member 5 protecting the magnetic tape at the front of the cassette casing 4 from dust and/or damage, the tape cover member 5 being pivotably mounted at both ends of the front edge of the cassette casing 4 by way of pins 6.

The cassette casing 4 comprises a rectangular lower shell 7 and a rectangular upper shell 8 and is fabricated by assembling the upper and lower shells 7 and 8 by means of screws or the like. The upper shell 8 constituting the upper surface of the cassette casing 4 is provided with a window 9. The window 9 is provided with a transparent plate 10 integral with the upper shell 8, so that the inside tape reels 3 can be observed from the window 9 through the transparent plate 10. The transparent plate 10 is ruled near its center. The rule marks extend longitudinally along the cassette casing 4 at constant intervals, and can be used to judge how much tape remains. Plate springs 11 are mounted on the inside surface of the upper shell 8 so that the tape reel 3 is resiliently biased from above.

FIG. 2 is a perspective view of a tape reel 3, according to the invention, housed within the cassette casing 4. The tape reel 3 comprises a upper flange 14 and a lower flange 13 which are mounted on an axle 12. The lower flange (reel hub) 13 is made of an opaque resin, the periphery of which is provided with teeth 15.

The upper flange 14 is made of a transparent material so that the amount of the magnetic tape 2 remaining on the tape reel 3 can be observed from above.

The surface of the upper flange 14 is rough, the roughness of which may be on the scale of 5 to 20 $\mu$m. If the roughness is on the scale of less than 5 $\mu$m, the surface will not appear to be rough. If the roughness is on a scale greater than 20 $\mu$m, the surface would be nearly opaque and it will be hard to see how much tape is left. Therefore, the roughness of the surface of the flange 14 should be on the scale of 5 to 20 $\mu$m, and preferably 5 to 10 $\mu$m. Thus, the rough surface has the texture of rough paper or a pear skin.

Both the upper and lower surfaces of the upper flange 14 may be rough, or a single surface may be rough. The surface of the upper flange 14 may be made rough by forming fine concave-convex surfaces on the inside surface of an injection molding metallic mold. Alternatively, it may be made rough by applying suitable chemicals to the surface of the upper flange. The surface of the window 9 may also be rough.

According to the invention, the upper flanges 14 of the tape reels 3 are made of a transparent material, but one or both surfaces thereof are transparent. Therefore, even if dust and/or scars appear on the upper flange 14, the dust and/or scars will not be conspicuous. Therefore, the external appearance of the magnetic tape cassette will not be ugly.

Furthermore, part of the light illuminating the surface of the upper flange 14 is reflected by the surface since its transmittance is slightly lower due to the roughness of the upper surface 14. Therefore, flange oscillations can be measured optically, whereupon the upper flange need not be damaged by a contact needle.

What is claimed is:

1. A magnetic tape cassette comprising:
a tape reel onto which a magnetic tape is wound, and which has a reel flange;
a cassette casing which houses said tape reel;
a window provided in said cassette casing in order to observe the inside magnetic tape; and
means comprising a rough surface said rough surface having a roughness on a scale of 5 to 20 $\mu$m, on at least one of said reel flange and said window preventing dust and/or damage scars on the surface of said reel flange from being noticeable when viewed at said window, said preventing means being sufficiently translucent to permit remaining tape on said tape reel to be seen through said window.

2. A magnetic tape cassette as set forth in claim 1, wherein said means comprises a translucent rough surface formed on the reel flange facing the window.

3. A magnetic tape cassette as set forth in claim 1, wherein said means comprises a translucent rough surface formed on the window, said rough surface having a roughness on a scale of 5 to 20 $\mu$m.

4. A magnetic tape cassette as set forth in in claim 2, wherein said rough surface has a roughness on a scale of 5 to 10 $\mu$m.

5. A magnetic tape cassette as set forth in claim 3, wherein said rough surface has a roughness on a scale of 5 to 10 $\mu$m.

6. A magnetic tape cassette as set forth in claim 4, wherein said upper flange is made of a slightly opaque material so that flange oscillation can be measured optically.

7. A magnetic tape cassette as set forth in claim 4, wherein said rough surface has the texture of rough paper.

8. A magnetic tape cassette as set forth in claim 4, wherein said rough surface has the texture of pear skin.

9. A magnetic tape cassette as set forth in claim 4, wherein only one surface of said upper flange is rough.

10. A magnetic tape cassette as set forth in claim 4, wherein both surfaces of said upper flange are rough.

11. A magnetic tape cassette comprising:
a tape reel onto which a magnetic tape is wound;
a reel flange fixed to said tape reel, said flange having a translucent rough surface which has a roughness on a scale of 5 to 20 $\mu$m; and
a cassette casing, comprised of an upper and a lower shell, which houses said tape reel and said reel flange, the upper shell being formed with a window in order to observe the inside magnetic tape.

12. A magnetic tape cassette comprising:
a tape reel onto which a magnetic tape is wound;
a reel flange fixed to said tape reel;
a cassette casing, comprised of an upper and a lower shell, which houses said tape reel and said reel flange, the upper shall being formed with a window having a translucent rough surface which has a roughness on a scale of 5 to 20 $\mu$m.

13. A magnetic tape cassette comprising:
a tape reel onto which a magnetic tape is wound, and which has a reel flange;
a cassette casing which houses said tape reel;
a window provided in said cassette casing in order to observe the inside magnetic tape; and
means comprising a translucent rough surface with a roughness on a scale of 5 to 20 $\mu$m formed on either an upper flange or the window for making dust and/or damage scars on the surface of said reel flange to be inconspicuous.

14. A magnetic tape cassette as set forth in claim 13 wherein said translucent rough surface is formed on the upper flange.

15. A magnetic tape cassette as set forth in claim 13 wherein said translucent rough surface is formed on the window.

16. A magnetic tape cassette as set forth in claim 14, wherein said rough surface has a roughness on a scale of 5 to 10 $\mu$m.

17. A magnetic tape cassette as set forth in claim 15, wherein said rough surface has a roughness on a scale of 5 to 10 $\mu$m.

18. A magnetic tape cassette as set forth in claim 13, wherein said upper flange is made of a slightly opaque material so that flange oscillation can be measured optically.

19. A magnetic tape cassette as set forth in claim 13, wherein said rough surface has the texture of rough paper.

20. A magnetic tape cassette as set forth in claim 13, wherein said rough surface has the texture of pear skin.

21. A magnetic tape cassette as set forth in claim 14, wherein only one surface of said upper flange is rough.

22. A magnetic tape cassette as set forth in claim 14, wherein both surfaces of said upper flange are rough.

* * * * *